United States Patent
Sakai et al.

(10) Patent No.: US 11,447,612 B2
(45) Date of Patent: Sep. 20, 2022

(54) SHEET

(71) Applicant: Oji Holdings Corporation, Tokyo (JP)

(72) Inventors: Koh Sakai, Chiba (JP); Hayato Fushimi, Chiba (JP); Hirokazu Sunagawa, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 689 days.

(21) Appl. No.: 16/315,723

(22) PCT Filed: Jul. 7, 2017

(86) PCT No.: PCT/JP2017/024907
§ 371 (c)(1),
(2) Date: Aug. 13, 2019

(87) PCT Pub. No.: WO2018/008735
PCT Pub. Date: Jan. 11, 2018

(65) Prior Publication Data
US 2021/0301095 A1  Sep. 30, 2021

(30) Foreign Application Priority Data
Jul. 8, 2016 (JP) ............... JP2016-136200

(51) Int. Cl.
| C08J 5/18 | (2006.01) |
| C08J 5/04 | (2006.01) |
| C08L 1/02 | (2006.01) |
| C08L 1/16 | (2006.01) |
| C08L 29/04 | (2006.01) |

(52) U.S. Cl.
CPC ............ *C08J 5/18* (2013.01); *C08J 5/045* (2013.01); *C08L 1/02* (2013.01); *C08L 1/16* (2013.01); *C08L 29/04* (2013.01); *C08L 2205/16* (2013.01); *C08L 2312/00* (2013.01)

(58) Field of Classification Search
CPC combination set(s) only.
See application file for complete search history.

(56) References Cited

U.S. PATENT DOCUMENTS

| 10,697,118 | B2* | 6/2020 | Mikami | D21H 19/00 |
| 2006/0182941 | A1* | 8/2006 | Yano | C08J 5/005 |
| | | | | 428/292.1 |
| 2009/0298976 | A1* | 12/2009 | Yano | C08L 1/02 |
| | | | | 524/35 |
| 2009/0305033 | A1* | 12/2009 | Yano | D21H 21/26 |
| | | | | 428/339 |
| 2016/0130757 | A1* | 5/2016 | Mikami | D21H 19/00 |
| | | | | 162/207 |
| 2017/0313831 | A1* | 11/2017 | Kakutani | B32B 15/14 |
| 2018/0230279 | A1* | 8/2018 | Banzashi | B32B 7/02 |
| 2018/0265597 | A1* | 9/2018 | Homma | C08B 5/00 |
| 2018/0282946 | A1* | 10/2018 | Fushimi | D21H 11/18 |
| 2018/0347117 | A1* | 12/2018 | Fushimi | D21H 27/32 |
| 2019/0359795 | A1* | 11/2019 | Sakai | C08L 1/16 |
| 2020/0399443 | A1* | 12/2020 | Zhao | C08L 1/02 |

FOREIGN PATENT DOCUMENTS

| CN | 102887005 A | 1/2013 |
| CN | 102933767 A | 2/2013 |
| CN | 105247136 A | 1/2016 |
| EP | 2 998 435 A1 | 3/2016 |
| JP | 2010-242063 A | 10/2010 |
| JP | 2013-127141 A | 6/2013 |
| JP | 2013-528239 A | 7/2013 |
| JP | 2015-157955 A | 9/2015 |
| JP | 2017-52840 A | 3/2017 |
| WO | 2011/147823 A1 | 12/2011 |
| WO | 2013/073652 A1 | 5/2013 |
| WO | 2014/196357 A1 | 12/2014 |
| WO | 2015/033026 A1 | 3/2015 |

OTHER PUBLICATIONS

Qiu et al. (Composites Science and Technology 72 (2012) 1588-1594) (Year: 2012).*
Lu et al., "Preparation and properties of microfibrillated cellulose polyvinyl alcohol composite materials", Composites: Part A, vol. 39, No. 5, pp. 738-746 (2008).
Bhatnagar et al., "Processing of Cellulose Nanofiber-reinforced Composites", Journal of Reinforced Plastics and Composites, vol. 24, No. 12, pp. 1259-1268 (2005).
International Search Report dated Oct. 3, 2017 in International Application No. PCT/JP2017/024907.
Written Opinion dated Oct. 3, 2017 in International Application No. PCT/JP2017/024907.
International Preliminary Report on Patentability dated Jan. 8, 2019 International Application No. PCT/JP2017/024907.
Office Action dated Apr. 26, 2021 from the Korean Intellectual Property Office in KR Application No. 10-2019-7001061.
XP-002797081, Database WPI, Week 201337, Thomson Scientific, London, GB, 2017, 2 pages.
Extended European Search Report (EESR) dated Feb. 4, 2020 by the European Patent Office in European application No. 17824338.2.
Office Action dated Dec. 17, 2020, issued by the National Intellectual Property Administration, PRC in Chinese application No. 201780042343.6.
Office Action dated Jul. 30, 2020 from the Korean Intellectual Property Office in Korean Application No. 10-2019-7001061.
Communication dated Sep. 8, 2020, from the Taiwanese Patent Office in Taiwanese application No. 106122877.

(Continued)

*Primary Examiner* — Liam J Heincer
(74) *Attorney, Agent, or Firm* — Sughrue Mion, PLLC

(57) ABSTRACT

The purpose of the present invention is to provide a composite sheet in which the dimension stability when it is tensed is high and the appearance deterioration and the yellowness change are suppressed. The present invention relates to a sheet comprising; cellulose fibers having a fiber width of 1000 nm or less and having a phosphoric acid group or a phosphoric acid group-derived substituent; and a polyvinyl alcohol-based resin, wherein the sheet has a tensile elastic modulus of 3.4 GPa or more.

6 Claims, 2 Drawing Sheets

(56) References Cited

OTHER PUBLICATIONS

Communication dated Oct. 28, 2020, from the European Patent Office in European application No. 17824338.2.
Office Action dated Feb. 5, 2021 by the Korean Patent Office in Korean application No. 10-2019--7001061.
Office Action dated Jul. 27, 2021 by the Japanese Patent Office in Japanese Application No. 2018-526448.
Trial Decision dated Jan. 27, 2022 issued by the Korean Patent Office in the corresponding Korean patent application No. 10-2019-7001061.
Decision of Refusal dated Mar. 1, 2022 issued by the Japanese Patent Office in corresponding Japanese patent application No. 2018-526448.

* cited by examiner

[Figure 1]
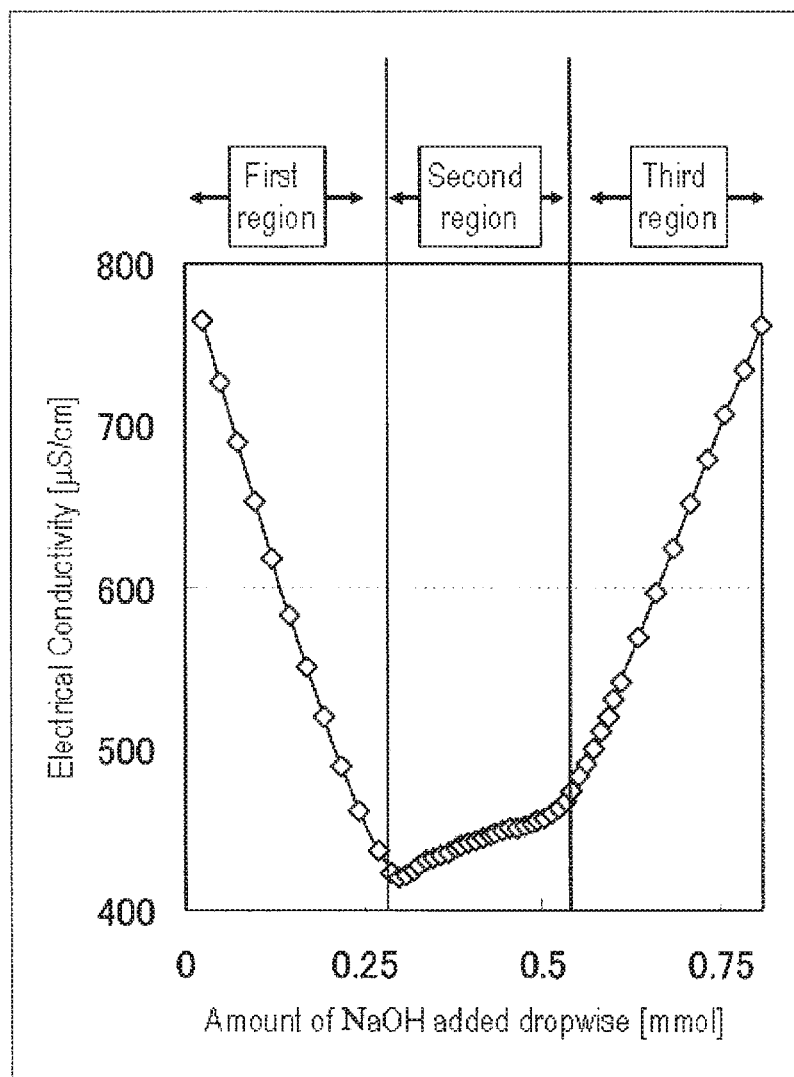

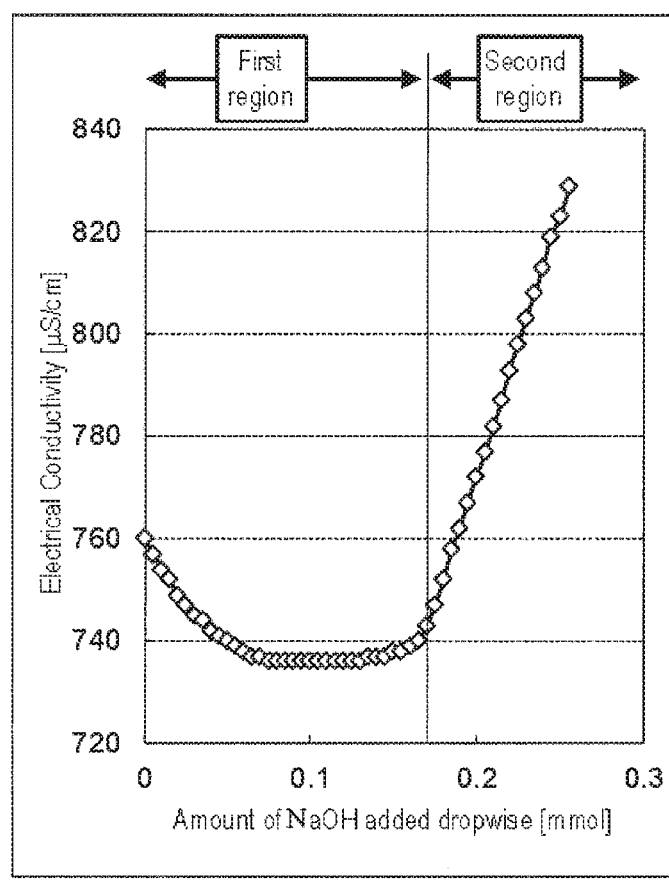
[Figure 2]

SHEET

CROSS REFERENCE TO RELATED APPLICATIONS

This Application is a National Stage of International Application No. PCT/JP2017/024907 filed Jul. 7, 2017, claiming priority based on Japanese Patent Application No. 2016-136200 filed Jul. 8, 2016.

TECHNICAL FIELD

The present invention relates to a sheet. Specifically, the present invention relates to a sheet comprising ultrafine cellulose fibers.

BACKGROUND ART

In recent years, because of enhanced awareness of alternatives to petroleum resources and environmental consciousness, there has been a focus on materials utilizing reproducible natural fibers. Among natural fibers, cellulose fibers having a fiber diameter of 10 μm or more and 50 μm or less, in particular, wood-derived cellulose fibers (pulp) have been widely used mainly as paper products so far.

Ultrafine cellulose fibers, which have a fiber diameter of 1 μm or less, have also been known as cellulose fibers. In addition, a sheet composed of such ultrafine cellulose fibers, and a complex comprising an ultrafine cellulose fiber-containing sheet and a resin, have been developed. Since the contacts of fibers are significantly increased in a sheet or a complex that contains ultrafine cellulose fibers, it has been known that tensile strength and the like are significantly improved in such a sheet or a complex.

Patent Document 1 discloses a complex comprising cellulose nanofibers and a polyvinyl alcohol-based polymer. Patent Document 2 discloses a method for producing a polyvinyl alcohol film, comprising a step of performing cast film formation on a raw material solution for film formation that has been prepared by adding cellulose fibers having a number average fiber diameter of 2 to 150 nm to a polyvinyl alcohol resin. Patent Documents 1 and 2 describe that some hydroxyl groups of cellulose are oxidized to at least one functional group selected from the group consisting of carboxyl groups and aldehyde groups.

In addition, Patent Document 3 discloses a method for producing a sheet containing ultrafine fibers, comprising a coating step of applying a dispersion containing ultrafine fibers having a fiber diameter of 1000 nm or less onto a base material, and a drying step of drying the dispersion containing ultrafine fibers applied onto the base material to form a sheet containing ultrafine fibers. Patent Document 3 describes that a hydrophilic polymer may be added into a dispersion.

PRIOR ART DOCUMENTS

Patent Documents

Patent Document 1: JP Patent Publication (Kokai) No. 2010-242063 A
Patent Document 2: JP Patent Publication (Kokai) No. 2015-157955 A
Patent Document 3: International Publication No. WO 2014/196357

SUMMARY OF INVENTION

Object to be Solved by the Invention

With regard to a composite sheet comprising an ultrafine cellulose fiber-containing sheet and a resin, it is desired that the dimension stability when it is tensed is high. Also, it is preferred that the appearance deterioration due to shrinkage and the like and the yellowness change are suppressed with regard to the obtained composite sheet. Hence, the present inventors have conducted studies for the purpose of providing a composite sheet having high dimension stability when it is tensed, in which the appearance deterioration and the yellowness change are suppressed.

Means for Solving the Object

As a result of intensive studies directed towards achieving the aforementioned object, the present inventors have found that, with regard to a sheet comprising cellulose fibers having a fiber width of 1000 nm or less and a polyvinyl alcohol-based resin, a sheet in which the dimension stability when it is tensed is high and the appearance deterioration and the yellowness change are suppressed can be obtained by introducing a phosphoric acid group or a phosphoric acid group-derived substituent into the cellulose fibers and setting the tensile elastic modulus of the sheet.

Specifically, the present invention has the following configurations.

[1] A sheet comprising: cellulose fibers having a fiber width of 1000 nm or less and having a phosphoric acid group or a phosphoric acid group-derived substituent; and a polyvinyl alcohol-based resin, wherein the sheet has a tensile elastic modulus of 3.4 GPa or more.
[2] The sheet according to the above [1], wherein the content of the polyvinyl alcohol-based resin is 9% by mass or more, with respect to the total mass of the sheet.
[3] The sheet according to the above [1] or [2], wherein the polyvinyl alcohol-based resin is a modified polyvinyl alcohol-based resin.
[4] The sheet according to any one of the above [1] to [3], which further comprises at least any one selected from crosslinkers and crosslinker-derived functional groups.
[5] The sheet according to any one of the above [1] to [4], wherein, when the yellowness of a sheet measured in accordance with JIS K 7373 is set at $YI_1$ and the yellowness of a sheet after being subjected to vacuum drying at 200° C. for 4 hours is $YI_2$, the value of $YI_2-YI_1$ is 70 or less.
[6] The sheet according to the above [4], wherein the content of the polyvinyl alcohol-based resin is 90% by mass or less, with respect to the total mass of the sheet.

Advantageous Effects of Invention

According to the present invention, an ultrafine cellulose fiber-containing sheet, in which the dimension stability when it is tensed is high and the appearance deterioration and the yellowness change are suppressed, can be obtained.

BRIEF DESCRIPTION OF DRAWINGS

FIG. 1 is a graph showing the relationship between the amount of NaOH added dropwise to a fiber raw material and the electrical conductivity.

FIG. 2 is a graph showing the relationship between the amount of NaOH added dropwise to a fiber raw material having a carboxyl group and the electrical conductivity.

EMBODIMENTS OF CARRYING OUT THE INVENTION

Hereinafter, the present invention will be described in detail. The below-mentioned constituent features will be explained based on representative embodiments or specific examples in some cases. However, the present invention is not limited to such embodiments.

(Sheet)

The present invention relates to a sheet comprising cellulose fibers having a fiber width of 1000 nm or less and a polyvinyl alcohol-based resin. The sheet of the present invention has a tensile elastic modulus of 3.4 GPa or more. Since the sheet of the present invention comprises cellulose fibers having a fiber width of 1000 nm or less (hereinafter also referred to as "ultrafine cellulose fibers"), the present sheet can also be referred to as an "ultrafine cellulose fiber-containing sheet." Since the sheet of the present invention has the above-described configurations, the dimension stability when it is tensed is high. In the sheet of the present invention, the appearance deterioration due to shrinkage and the like is also suppressed. Further, in the sheet of the present invention, the yellowness change is small. The sheet is characterized in that the yellowness increase is low, for example even when the sheet is dried under heating.

The tensile elastic modulus of the sheet of the present invention may be 3.4 GPa or more, and it is preferably 4.0 GPa or more, more preferably 4.5 GPa or more, and further preferably 5.0 GPa or more. In addition, the upper limit value of the tensile elastic modulus of the sheet is not particularly limited, but it may be set at, for example, 50 GPa or less. By setting the tensile elastic modulus of the sheet within the aforementioned range, the dimension stability when it is tensed can be increased, and the appearance deterioration due to shrinkage and the like and the yellowness change can be effectively suppressed. Herein, the tensile elastic modulus of the sheet is a value measured using a tension testing machine "Tensilon" (manufactured by A & D Company, Limited) in accordance with JIS P8113. Upon the measurement of the tensile elastic modulus, a test piece to be measured is prepared by humidity conditioning for 24 hours at 23° C. and a relative humidity of 50%, and the measurement is carried out under conditions of 23° C. and a relative humidity of 50%.

In the present invention, as a resin to be comprised in the sheet, a polyvinyl alcohol-based resin was used, and further, the content of the polyvinyl alcohol-based resin and the content of ultrafine cellulose fibers are appropriately controlled to make a good balance, so that the tensile elastic modulus of the sheet can be set within the above-described range. Thus, a sheet in which the dimension stability when it is tensed is high and the appearance deterioration and the yellowness change are suppressed can be obtained.

The yellowness of the sheet of the present invention is preferably 5.0 or less, more preferably 3.0 or less, further preferably 2.0 or less, and particularly preferably 1.0 or less. Herein, the yellowness of the sheet is the yellowness of a sheet obtained in the step of forming a sheet, and thus, it is the yellowness of a sheet before being subjected to the after-mentioned heat drying step. The yellowness of the sheet is a value measured in accordance with JIS K 7373. The measuring apparatus used herein may be, for example, Colour Cute i (manufactured by Suga Test Instruments Co., Ltd.).

The yellowness of the sheet of the present invention obtained after the vacuum drying of the sheet at 200° C. for 4 hours is preferably 70 or less, more preferably 55 or less, further preferably 50 or less, still further preferably 40 or less, particularly preferably 30 or less, still particularly preferably 25 or less, and most preferably 20 or less. The yellowness of the sheet obtained after the vacuum drying at 200° C. for 4 hours is also a value measured in accordance with JIS K 7373, as described above.

As mentioned above, when the yellowness of a sheet before being subjected to a heat drying step is set at $YI_1$, and the yellowness of a sheet after being subjected to vacuum drying at 200° C. for 4 hours is $YI_2$, the value of $YI_2-YI_1$ ($\Delta YI$) is preferably 70 or less, more preferably 55 or less, even more preferably 50 or less, further preferably 40 or less, particularly preferably 30 or less, still particularly preferably 25 or less, and most preferably 20 or less. In the present invention, the value of $YI_2-YI_1$ ($\Delta YI$) can be set within the above-described range, so that the yellowness of the sheet can be suppressed, and in particular, the yellowness caused by heat drying can be effectively suppressed. In the present invention, the $\Delta YI$ value can be adjusted within the above-described range by introducing a phosphoric acid group or a phosphoric acid group-derived substituent into ultrafine cellulose fibers, and using a polyvinyl alcohol-based resin as a resin to be added into the sheet, and so on.

The total light transmittance of the sheet of the present invention is preferably 85% or more, more preferably 90% or more, and further preferably 91% or more. In addition, the haze of the sheet is preferably 10% or less, more preferably 5% or less, further preferably 3% or less, still further preferably 2% or less, and particularly preferably 1% or less. The haze of the sheet may also be 0%. The present invention is also characterized in that a highly transparent sheet can be obtained. Herein, the total light transmittance of the sheet is a value measured in accordance with JIS K 7361, and the haze of the sheet is a value measured in accordance with JIS K 7136. The two above values are both measured using a hazemeter (manufactured by MURAKAMI COLOR RESEARCH LABORATORY Co., Ltd.; HM-150). In the present invention, the total light transmittance of the sheet and the haze value can be adjusted within the above-described range by introducing a phosphoric acid group or a phosphoric acid group-derived substituent into ultrafine cellulose fibers, and using a polyvinyl alcohol-based resin as a resin to be added into the sheet, and so on.

In the sheet of the present invention, the appearance deterioration due to shrinkage and the like is suppressed. Also, since occurrence of wrinkle, shrinkage and the like is suppressed in the sheet of the present invention, the sheet shape is smooth. The aforementioned effect is achieved by using a polyvinyl alcohol-based resin as a resin to be comprised in the sheet, and appropriately controlling the content of the polyvinyl alcohol-based resin and the content of ultrafine cellulose fibers to make a good balance.

The thickness of the sheet of the present invention is not particularly limited, but it is preferably 5 μm or more, more preferably 10 μm or more, and further preferably 20 μm or more. In addition, the upper limit value of the thickness of the sheet is not particularly limited, but it may be set at, for example, 1000 μm or less. Besides, the thickness of the sheet can be measured using a stylus thickness gauge (manufactured by Mahr; Millitron 1202 D).

The basis weight of the sheet of the present invention is preferably 10 g/m² or more, more preferably 20 g/m² or more, and further preferably 30 g/m² or more. On the other hand, the basis weight of the sheet is preferably 100 g/m² or less, and more preferably 80 g/m² or less. Herein, the basis weight of the sheet can be calculated in accordance with JIS P 8124.

(Cellulose Fibers)

The sheet of the present invention comprises cellulose fibers having a fiber width of 1000 nm or less and having a phosphoric acid group or a phosphoric acid group-derived substituent. In the present description, cellulose fibers having a fiber width of 1000 nm or less are also referred to as "ultrafine cellulose fibers," at times. Also, cellulose fibers having a fiber width of 1000 nm or less and having a phosphoric acid group or a phosphoric acid group-derived substituent are referred to as "phosphorylated ultrafine cellulose fibers," at times.

The content of the ultrafine cellulose fibers is preferably 7% by mass or more, more preferably 10% by mass or more, further preferably 30% by mass or more, and still further preferably 50% by mass or more, with respect to the total mass of the sheet. In the sheet of the present invention, the content of the ultrafine cellulose fibers may be 80% by mass or more, and may be 90% by mass or more. The upper limit of the content of the ultrafine cellulose fibers is not particularly limited, and may be 95% by mass or less.

The lower limit of the content of the ultrafine cellulose fibers in the sheet is not particularly limited, but it is preferably 0.05 times or more, more preferably 0.1 time or more, and may also be 1/9 times or more, 0.2 times or more, 0.25 times or more, 0.3 times or more, 0.4 times or more, 3/7 times or more, 0.5 times or more, 2/3 times or more, 40/54 times or more, 1 time or more, or 59.9/40.1 times or more, with respect to the content of the polyvinyl alcohol-based resin.

The upper limit of the content of the ultrafine cellulose fibers in the sheet is not particularly limited, but it is preferably 20 times or less, more preferably 15 times or less, further preferably 10 times or less, and may also be 90.9/9.1 times or less, 5 times or less, 80/18 times or less, 4 times or less, or 59.9/40.1 times or less, with respect to the content of the polyvinyl alcohol-based resin.

When the content of the ultrafine cellulose fibers is high with respect to the content of the polyvinyl alcohol-based resin, the elastic modulus of the sheet tends to become high. When a sheet having a high elastic modulus is to be produced, the content of the ultrafine cellulose fibers in the sheet is set to be preferably 1 time to 20 times, more preferably 2 times to 20 times, further preferably 4 times to 20 times, and particularly preferably 4 times to 10 times the content of the polyvinyl alcohol-based resin.

When the content of the ultrafine cellulose fibers is low with respect to the content of the polyvinyl alcohol-based resin, the yellowness change ($\Delta YI$) of a sheet tends to become low. When a sheet having a low yellowness change ($\Delta YI$) is to be produced, the content of the ultrafine cellulose fibers in the sheet is set to be preferably 0.05 times to 1 time, and more preferably 0.1 time to 1 time the content of the polyvinyl alcohol-based resin.

Although there is no particular restriction on a cellulose fiber raw material for obtaining ultrafine cellulose fibers, pulp is preferably used from the viewpoint of availability and inexpensiveness. Examples of the pulp include wood pulp, non-wood pulp, and deinked pulp. Examples of the wood pulp include chemical pulps such as hardwood kraft pulp (LBKP), softwood kraft pulp (NBKP), sulfite pulp (SP), dissolving pulp (DP), soda pulp (AP), unbleached kraft pulp (UKP), and oxygen bleached kraft pulp (OKP). Further, included are, but not particularly limited to, semichemical pulps such as semi-chemical pulp (SCP) and chemi-ground wood pulp (CGP); and mechanical pulps such as ground pulp (GP) and thermomechanical pulp (TMP, BCTMP). Examples of the non-wood pulp include, but not particularly limited to, cotton pulps such as cotton linter and cotton lint; non-wood type pulps such as hemp, wheat straw, and bagasse; and cellulose isolated from ascidian, seaweed, etc., chitin, and chitosan. As a deinked pulp, there is deinked pulp using waste paper as a raw material, but it is not particularly limited thereto. The pulp of the present embodiment may be used singly, or in combination of two or more types. Among the above-listed pulp types, wood pulp and deinked pulp including cellulose are preferable from the viewpoint of easy availability. Among wood pulps, chemical pulp is preferable because it has a higher cellulose content to enhance the yield of ultrafine cellulose fibers and decomposition of cellulose in the pulp is mild at the time of fibrillation (defibration) to yield ultrafine cellulose fibers having a long fiber length with a high aspect ratio. Among them, kraft pulp and sulfite pulp are most preferably selected. A fiber layer containing the ultrafine cellulose fibers having a long fiber length with a high aspect ratio tends to exhibit a high strength.

The average fiber width of ultrafine cellulose fibers is 1000 nm or less as observed with an electron microscope. The average fiber width is preferably 2 nm or more and 1000 nm or less, more preferably 2 nm or more and 100 nm or less, even more preferably 2 nm or more and 50 nm or less, and further preferably 2 nm or more and 10 nm or less, but is not particularly limited thereto. When the average fiber width of ultrafine cellulose fibers is less than 2 nm, since they are dissolved in water as cellulose molecules, there appears tendency that the physical properties (strength, rigidity, and dimensional stability) as an ultrafine cellulose fiber are not expressed sufficiently. The ultrafine cellulose fiber is, for example, monofilament cellulose having a fiber width of 1000 nm or less.

The measurement of a fiber width of an ultrafine cellulose fiber by electron microscopic observation is carried out as follows. An aqueous suspension of ultrafine cellulose fibers having a concentration of 0.05% by mass or more and 0.1% by mass or less is prepared, and the suspension is casted onto a hydrophilized carbon film-coated grid as a sample for TEM observation. If the sample contains wide fibers, SEM images of the surface of the suspension casted onto glass may be observed. The sample is observed using electron microscope images taken at a magnification of 1000×, 5000×, 10000×, or 50000× according to the widths of the constituent fibers. However, the sample, the observation conditions, and the magnification are adjusted so as to satisfy the following conditions:

(1) A single straight line X is drawn in any given portion in an observation image, and 20 or more fibers intersect with the straight line X.

(2) A straight line Y, which intersects perpendicularly with the aforementioned straight line in the same image as described above, is drawn, and 20 or more fibers intersect with the straight line Y.

The widths of the fibers intersecting the straight line X and the straight line Y in the observation image meeting the above-described conditions are visually read. 3 or more sets of images of surface portions, which are at least not overlapped, are thus observed, and the widths of the fibers intersecting the straight line X and the straight line Y are read in the each image. At least 120 fiber widths (20 fibers×2×3=120) are thus read. The average fiber width (which is simply referred to as a "fiber width" at times) of ultrafine cellulose fibers is an average value of the fiber widths thus read.

The fiber length of the ultrafine cellulose fibers is not particularly limited, but it is preferably 0.1 μm or more and 1000 μm or less, more preferably 0.1 μm or more and 800

μm or less, and particularly preferably 0.1 μm or more and 600 μm or less. By setting the fiber length within the above-described range, destruction of the crystalline region of the ultrafine cellulose fibers can be suppressed, and the slurry viscosity of the ultrafine cellulose fibers can also be set within an appropriate range. It is to be noted that the fiber length of the ultrafine cellulose fibers can be obtained by an image analysis using TEM, SEM or AFM.

Ultrafine cellulose fibers preferably have a type I crystal structure. In this regard, the fact that ultrafine cellulose fibers have a type I crystal structure may be identified by a diffraction profile obtained from a wide angle X-ray diffraction photograph using CuKα (λ=1.5418 Å) monochromatized with graphite. Specifically, it may be identified based on the fact that there are typical peaks at two positions near 2θ=140 or more and 17° or less, and near 2θ=22° or more and 23° or less.

The percentage of the type I crystal structure occupied in the ultrafine cellulose fibers is preferably 30% or more, more preferably 50% or more, and further preferably 70% or more. In this case, more excellent performance can be expected, in terms of heat resistance and the expression of low linear thermal expansion. The crystallinity can be obtained by measuring an X-ray diffraction profile and then obtaining it from the obtained pattern according to a common method (Seagal et al., Textile Research Journal, Vol. 29, p. 786, 1959).

The ultrafine cellulose fibers preferably have phosphoric acid groups or substituents derived from the phosphoric acid group. The phosphoric acid group is a divalent functional group corresponding to a phosphoric acid from which a hydroxyl group is removed. Specifically, it is a group represented by —PO$_3$H$_2$. The substituents derived from the phosphoric acid group include substituents, such as condensation-polymerized phosphoric acid groups, salts of phosphoric acid groups, and phosphoric acid ester groups, and they may be either ionic substituents or nonionic substituents.

In the present invention, the phosphoric acid group or a substituent derived from the phosphoric acid group may be a substituent represented by the following Formula (1):

[Formula 1]

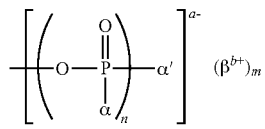

(1)

In the Formula (1), a, b, m and n each independently represent an integral number (provided that a=b×m); α and α' each independently represent R or OR. R is a hydrogen atom, a saturated straight chain hydrocarbon group, a saturated branched chain hydrocarbon group, a saturated cyclic hydrocarbon group, an unsaturated straight chain hydrocarbon group, an unsaturated branched chain hydrocarbon group, an aromatic group, or a derivative group thereof; and β is a monovalent or higher valent cation consisting of organic matter or inorganic matter.

<Phosphoric Acid Group Introduction Step>

The phosphoric acid group introduction step may be performed by allowing at least one selected from a compound having phosphoric acid groups and salts thereof (hereinafter, referred to as a "phosphorylating reagent" or "Compound A") to react with the fiber raw material including cellulose. Such a phosphorylating reagent may be mixed into the fiber raw material in a dry or wet state, in the form of a powder or an aqueous solution. In another example, a powder or an aqueous solution of the phosphorylating reagent may be added into a slurry of the fiber raw material.

The phosphoric acid group introduction step may be performed by allowing at least one selected from a compound having phosphoric acid groups and salts thereof (a phosphorylating reagent or Compound A) to react with the fiber raw material including cellulose. It is to be noted that this reaction may be performed in the presence of at least one selected from urea and derivatives thereof (hereinafter, referred to as "Compound B").

One example of the method of allowing Compound A to act on the fiber raw material in the presence of Compound B includes a method of mixing the fiber raw material in a dry or wet state with a powder or an aqueous solution of Compound A and Compound B. Another example thereof includes a method of adding a powder or an aqueous solution of Compound A and Compound B to a slurry of the fiber raw material. Among them, a method of adding an aqueous solution of Compound A and Compound B to the fiber raw material in a dry state, or a method of adding a powder or an aqueous solution of Compound A and Compound B to the fiber raw material in a wet state is preferable because of the high homogeneity of the reaction. Compound A and Compound B may be added at the same time or may be added separately. Alternatively, Compound A and Compound B to be subjected to the reaction may be first added as an aqueous solution, which may be then compressed to squeeze out redundant chemicals. The form of the fiber raw material is preferably a cotton-like or thin sheet form, but the form is not particularly limited thereto.

The Compound A used in the present embodiment is at least one selected from a compound having a phosphoric acid group and a salt thereof.

Examples of the compound having a phosphoric acid group include, but are not particularly limited to, phosphoric acid, lithium salts of phosphoric acid, sodium salts of phosphoric acid, potassium salts of phosphoric acid, and ammonium salts of phosphoric acid. Examples of the lithium salts of phosphoric acid include lithium dihydrogen phosphate, dilithium hydrogen phosphate, trilithium phosphate, lithium pyrophosphate, and lithium polyphosphate. Examples of the sodium salts of phosphoric acid include sodium dihydrogen phosphate, disodium hydrogen phosphate, trisodium phosphate, sodium pyrophosphate, and sodium polyphosphate. Examples of the potassium salts of phosphoric acid include potassium dihydrogen phosphate, dipotassium hydrogen phosphate, tripotassium phosphate, potassium pyrophosphate, and potassium polyphosphate. Examples of the ammonium salts of phosphoric acid include ammonium dihydrogen phosphate, diammonium hydrogen phosphate, triammonium phosphate, ammonium pyrophosphate, and ammonium polyphosphate.

Among them, from the viewpoints of high efficiency in introduction of the phosphoric acid group, an improving tendency of the defibration efficiency in a defibration step described below, low cost, and industrial applicability, phosphoric acid, sodium phosphate, potassium phosphate, and ammonium phosphate are preferable. Sodium dihydrogenphosphate, or disodium hydrogenphosphate is more preferable.

Further, since the uniformity of the reaction is improved and the efficiency in introduction of a phosphoric acid group is enhanced, the Compound A is preferably used as an aqueous solution. Although there is no particular restriction on the pH of an aqueous solution of the Compound A, the pH is preferably pH 7 or less because the efficiency in introduction of a phosphoric acid group is high, and more preferably pH 3 or more and pH 7 or less from the viewpoint of suppression of hydrolysis of a pulp fiber. The pH of an aqueous solution of the Compound A may be adjusted, for example, by using, among compounds having a phosphoric acid group, a combination of an acidic one and an alkaline one, and changing the amount ratio thereof. The pH of an aqueous solution of Compound A may also be adjusted by adding an inorganic alkali or an organic alkali to an acidic compound among compounds having a phosphoric acid group.

Although there is no particular restriction on the amount of the Compound A added to a fiber raw material, if the amount of the Compound A added is converted to a phosphorus atomic weight, the amount of phosphorus atoms added with respect to the fiber raw material (absolute dry mass) is preferably 0.5% by mass or more and 100% by mass or less, more preferably 1% by mass or more and 50% by mass or less, and most preferably 2% by mass or more and 30% by mass or less. When the amount of phosphorus atoms added to the fiber raw material is within the above-described range, the yield of ultrafine cellulose fibers can be further improved. On the other hand, by setting the amount of phosphorus atoms added to the fiber raw material at 100% by mass or less, the cost of the used Compound can be suppressed, while enhancing phosphorylation efficiency.

Examples of the Compound B used in the present embodiment include urea, biuret, 1-phenyl urea, 1-benzyl urea, 1-methyl urea, and 1-ethyl urea.

The Compound B is preferably used as an aqueous solution, as with the Compound A. Further, an aqueous solution in which both the Compound A and Compound B are dissolved is preferably used, because the uniformity of a reaction may be enhanced. The amount of the Compound B added to a fiber raw material (absolute dry mass) is preferably 1% by mass or more and 500% by mass or less, more preferably 10% by mass or more and 400% by mass or less, further preferably 100% by mass or more and 350% by mass or less, and particularly preferably 150% by mass or more and 300% by mass or less.

The reaction system may contain an amide or an amine, in addition to the compound A and the compound B. Examples of the amide include formamide, dimethylformamide, acetamide, and dimethylacetamide. Examples of the amine include methylamine, ethylamine, trimethylamine, triethylamine, monoethanolamine, diethanolamine, triethanolamine, pyridine, ethylenediamine, and hexamethylenediamine. Among them, particularly, triethylamine is known to work as a favorable reaction catalyst.

In the phosphoric acid group introduction step, it is preferable to perform a heat treatment. For the temperature of such a heat treatment, it is preferable to select a temperature that allows an efficient introduction of phosphoric acid groups while suppressing the thermal decomposition or hydrolysis reaction of fibers. Specifically, the temperature is preferably 50° C. or higher and 300° C. or lower, more preferably 100° C. or higher and 250° C. or lower, and further preferably 130° C. or higher and 200° C. or lower. In addition, a vacuum dryer, an infrared heating device, or a microwave heating device may be used for heating.

Upon the heat treatment, if the time for leaving the fiber raw material to stand still gets longer while the fiber raw material slurry to which the compound A is added contains water, as drying advances, water molecules and the compound A dissolved therein move to the surface of the fiber raw material. As such, there is a possibility of the occurrence of unevenness in the concentration of the compound A in the fiber raw material, and the introduction of phosphoric acid groups to the fiber surface may not progress uniformly. In order to suppress the occurrence of unevenness in the concentration of the compound A in the fiber raw material due to drying, the fiber raw material in the shape of a very thin sheet may be used, or a method of heat-drying or vacuum-drying the fiber raw material, while kneading or stirring with the compound A using a kneader or the like, may be employed.

As a heating device used for heat treatment, a device capable of always discharging moisture retained by slurry or moisture generated by an addition reaction of phosphoric acid groups with hydroxy groups of the fiber to the outside of the device system is preferable, and for example, forced convection ovens or the like are preferable. By always discharging moisture in the device system, in addition to being able to suppress a hydrolysis reaction of phosphoric acid ester bonds, which is a reverse reaction of the phosphoric acid esterification, acid hydrolysis of sugar chains in the fiber may be suppressed as well, and ultrafine fibers with a high axial ratio can be obtained.

The time for heat treatment is, although affected by the heating temperature, preferably 1 second or more and 300 minutes or less, more preferably 1 second or more and 1000 seconds or less, and further preferably 10 seconds or more and 800 seconds or less, after moisture is substantially removed from the fiber raw material slurry. In the present invention, by setting the heating temperature and heating time within an appropriate range, the amount of phosphoric acid groups introduced can be set within a preferred range.

The amount of phosphoric acid groups introduced is, per 1 g (mass) of the ultrafine cellulose fibers, preferably 0.1 mmol/g or more and 3.65 mmol/g or less, more preferably 0.14 mmol/g or more and 3.5 mmol/g or less, even more preferably 0.2 mmol/g or more and 3.2 mmol/g or less, particularly preferably 0.4 mmol/g or more and 3.0 mmol/g or less, and most preferably 0.6 mmol/g or more and 2.5 mmol/g or less. By setting the amount of phosphoric acid groups introduced within the above-described range, it may become easy to perform fibrillation on the fiber raw material, and the stability of the ultrafine cellulose fibers can be enhanced. In addition, by setting the amount of phosphoric acid groups introduced within the above-described range, it becomes possible to keep the hydrogen bond between ultrafine cellulose fibers, while facilitating fibrillation, and thus, the sheet is anticipated to have favorable strength.

The amount of phosphoric acid groups introduced into a fiber raw material may be measured by a conductometric titration method. Specifically, the amount introduced may be measured by performing fibrillation on ultrafine fibers in a defibration treatment step, treating the resulting slurry comprising ultrafine cellulose fibers with an ion exchange resin, and then examining a change in the electrical conductivity while adding an aqueous sodium hydroxide solution.

The conductometric titration confers a curve shown in FIG. 1 as an alkali is added. First, the electrical conductivity is rapidly reduced (hereinafter, this region is referred to as a "first region"). Then, the conductivity starts rising slightly (hereinafter, this region is referred to as a "second region"). Then, the increment of the conductivity is increased (hereinafter, this region is referred to as a "third region"). In short, three regions appear. The boundary point between the second region and the third region is defined as a point at which a change amount in the two differential values of conductivity, namely, an increase in the conductivity (inclination) becomes maximum. Among them, the amount of the alkali required for the first region among these regions is equal to the amount of a strongly acidic group in the slurry used in the titration, and the amount of the alkali required for the second region is equal to the amount of a weakly acidic group in the slurry used in the titration. When condensation of a phosphoric acid group occurs, the weakly acidic group is apparently lost, so that the amount of the alkali required for the second region is decreased as compared with the amount of the alkali required for the first region. On the other hand, the amount of the strongly acidic group agrees with the amount of the phosphorus atom regardless of the presence or absence of condensation. Therefore, the simple term "the amount of the phosphoric acid group introduced (or the amount of the phosphoric acid group)" or "the amount of the substituent introduced (or the amount of the substituent)" refers to the amount of the strongly acidic group. That is to say, the amount (mmol) of the alkali required for the first region in the curve shown in FIG. 1 is divided by the solid content (g) in the slurry as a titration target to obtain the amount (mmol/g) of the substituent introduced.

The phosphoric acid group introduction step may be performed at least once, but may be repeated multiple times as well. This case is preferable, since more phosphoric acid groups are introduced.

<Alkali Treatment>

When ultrafine cellulose fibers are produced, an alkali treatment may be conducted between an ionic functional group introduction step and a defibration treatment step described below. The method of the alkali treatment is not particularly limited. For example, a method of immersing phosphoric acid group-introduced fibers in an alkaline solution may be applied.

The alkali compound contained in the alkaline solution is not particularly limited, but it may be an inorganic alkaline compound or an organic alkali compound. The solvent of the alkaline solution may be either water or an organic solvent. The solvent is preferably a polar solvent (water, or a polar organic solvent such as alcohol), and more preferably an aqueous solvent containing at least water.

Among alkaline solutions, a sodium hydroxide aqueous solution, or a potassium hydroxide aqueous solution is particularly preferable, because of high versatility.

The temperature of the alkali solution in the alkali treatment step is not particularly limited, but it is preferably 5° C. or higher and 80° C. or lower, and more preferably 10° C. or higher and 60° C. or lower.

The immersion time in the alkali solution in the alkali treatment step is not particularly limited, but it is preferably 5 minutes or more and 30 minutes or less, and more preferably 10 minutes or more and 20 minutes or less.

The amount of the alkali solution used in the alkali treatment is not particularly limited, but it is preferably 100% by mass or more and 100000% by mass or less, and more preferably 1000% by mass and 10000% by mass or less, with respect to the absolute dry mass of the phosphoric acid group-introduced fibers.

In order to reduce the consumption of an alkaline solution in the alkali treatment step, phosphoric acid group-introduced fibers may be washed with water or an organic solvent before the alkali treatment step. After the alkali treatment, the alkali-treated phosphoric acid group-introduced fibers are preferably washed with water or an organic solvent before the defibration treatment step in order to improve the handling property.

<Defibration Treatment>

The phosphoric acid group-introduced fibers are subjected to a defibration treatment in a defibration treatment step. In the defibration treatment step, fibers are defibrated usually using a defibration treatment apparatus to yield a slurry comprising ultrafine cellulose fibers, and there is no particular restriction on a treatment apparatus, or a treatment method.

A high-speed defibrator, a grinder (stone mill-type crusher), a high-pressure homogenizer, an ultrahigh-pressure homogenizer, a high-pressure collision-type crusher, a ball mill, a bead mill, or the like can be used as the defibration treatment apparatus. Alternatively, for example, a wet milling apparatus such as a disc-type refiner, a conical refiner, a twin-screw kneader, an oscillation mill, a homomixer under high-speed rotation, an ultrasonic disperser, or a beater may also be used as the defibration treatment apparatus. The defibration treatment apparatus is not limited to the above. Examples of a preferred defibration treatment method include a high-speed defibrator, a high-pressure homogenizer, and an ultrahigh-pressure homogenizer, which are less affected by milling media, and are free from apprehension of contamination.

Upon the defibration treatment, the fiber raw material is preferably diluted with water and an organic solvent each alone or in combination, to prepare a slurry, though the method is not particularly limited thereto. Water as well as a polar organic solvent can be used as a dispersion medium. Preferred examples of the polar organic solvent include, but are not particularly limited to, alcohols, ketones, ethers, dimethyl sulfoxide (DMSO), dimethylformamide (DMF), and dimethylacetamide (DMAc). Examples of the alcohols include methanol, ethanol, n-propanol, isopropanol, n-butanol, and t-butyl alcohol. Examples of the ketones include acetone and methyl ethyl ketone (MEK). Examples of the ethers include diethyl ether and tetrahydrofuran (THF). One of these dispersion media may be used, or two or more thereof may be used. The dispersion medium may also contain a solid content other than the fiber raw material, for example, hydrogen-binding urea.

With regard to the ultrafine cellulose fibers, the ultrafine cellulose fiber-containing slurry obtained by the defibration treatment may be once concentrated and/or dried, and then, may be subjected to a defibration treatment again. In this case, there is no particular restriction on the method of concentration and drying, but examples thereof include a method in which a concentrating agent is added into a slurry comprising ultrafine cellulose fibers, and a method using a dehydrator, a press, a dryer, and the like used generally. Further, publicly known methods, for example as described in WO 2014/024876, WO 2012/107642, and WO 2013/121086, may be used. Also, the ultrafine cellulose fiber-containing slurry may be formed into a sheet, so that it is concentrated and dried. The formed sheet is subjected to a defibration treatment, so that an ultrafine cellulose fiber-containing slurry can be obtained again.

Examples of a device used for defibrating (pulverizing) the ultrafine cellulose fiber-containing slurry again, after the concentration and/or drying of the ultrafine cellulose fiber-containing slurry, include, but are not particularly limited to, a high-speed defibrator, a grinder (stone mill-type grinder), a high-pressure homogenizer, an ultra-high pressure homogenizer, a high-pressure collision type crusher, a ball mill, a bead mill, a disk type refiner, a conical refiner, a twin screw kneader, a vibrating mill, and a device for wet milling, such as a high-speed rotating homomixer, an ultrasonic disperser, or a beater.

(Polyvinyl Alcohol-Based Resin)

The sheet of the present invention comprises a polyvinyl alcohol-based resin (PVA-based resin). The polyvinyl alcohol-based resin is obtained by saponifying polyvinyl acetate. The saponification degree of the polyvinyl alcohol is not particularly limited, but it is preferably 50 mol % or more, more preferably 60 mol % or more, even more preferably 70 mol % or more, further preferably 80 mol % or more, still further preferably 85 mol % or more, particularly preferably 90 mol % or more, and most preferably 95 mol % or more. The saponification degree of the polyvinyl alcohol may be 100 mol %, and may be 99 mol % or less. The saponification degree of the polyvinyl alcohol-based resin can be measured in accordance with JIS K 6726.

The content of the polyvinyl alcohol-based resin is preferably 9% by mass or more, more preferably 10% by mass or more, further preferably 15% by mass or more, still further preferably 20% by mass or more, particularly preferably 30% by mass or more, still particularly preferably 40% by mass or more, and most preferably 55% by mass or more, with respect to the total mass of the sheet. On the other hand, the content of the polyvinyl alcohol-based resin is preferably 92% by mass or less, more preferably 85% by mass or less, and further preferably 75% by mass or less, with respect to the total mass of the sheet. The content of a polyvinyl alcohol-based resin is set within the aforementioned range, so that the dimension stability of the sheet when it is tensed can be effectively increased. Also, a sheet in which the appearance deterioration due to shrinkage and the like and the yellowness change are suppressed can be obtained. Further, the content of a polyvinyl alcohol-based resin is set within the aforementioned range, so that the film-forming property when sheet is formed can be increased and a sheet having good appearance can be obtained. The content of the polyvinyl alcohol-based resin can be measured, for example, by IR measurement.

The average degree of polymerization of the polyvinyl alcohol-based resin is not particularly limited, but it is preferably 300 or more, more preferably 400 or more, and further preferably 500 or more. On the other hand, the average degree of polymerization of the polyvinyl alcohol-based resin is preferably 20000 or less, more preferably 10000 or less, further preferably 5000 or less, particularly preferably 2200 or less, and most preferably 1700 or less. The average degree of polymerization of the polyvinyl alcohol-based resin can be measured in accordance with JIS K 6726.

An example of a preferred aspect of the polyvinyl alcohol-based resin is a polyvinyl alcohol-based resin having a low polymerization degree and a high saponification degree (e.g., the average degree of polymerization that is 1700 or less, and a saponification degree of 90 mol % or more).

The polyvinyl alcohol-based resin may be either an unmodified polyvinyl alcohol-based resin, or a modified polyvinyl alcohol-based resin. As such a polyvinyl alcohol-based resin, a combination of an unmodified polyvinyl alcohol-based resin with a modified polyvinyl alcohol-based resin may also be used. Herein, the modified polyvinyl alcohol-based resin is a polymer formed by introducing a functional group other than a hydroxyl group and an acetic acid group into an unmodified polyvinyl alcohol-based resin. Examples of the modified polyvinyl alcohol may include carboxyl group modified polyvinyl alcohol, carbonyl group modified polyvinyl alcohol, silanol group modified polyvinyl alcohol, amino group modified polyvinyl alcohol, cation modified polyvinyl alcohol, sulfonic acid group modified polyvinyl alcohol, and acetoacetyl group modified polyvinyl alcohol. Among these, acetoacetyl group modified polyvinyl alcohol is preferably used. The modified polyvinyl alcohol-based resins may be used in combination of one or two or more types. In the step of producing a sheet, some of such modified polyvinyl alcohol-based resins may form a self-crosslinked structure in some cases. Some modified polyvinyl alcohol-based resins form a self-crosslinked structure, so that the strength of the sheet can be improved.

At least some polyvinyl alcohol-based resins are preferably crosslinked to form crosslinked polyvinyl alcohol. In particular, at least some modified polyvinyl alcohol-based resins are preferably crosslinked to form crosslinked polyvinyl alcohol. In this case, such a crosslinked structure is formed between functional groups (except for hydroxyl groups and acetic acid groups) introduced into the modified polyvinyl alcohol-based resin. As crosslinkers used to form a crosslinked structure, the after-mentioned crosslinkers can be used. Such a crosslinked structure can be detected by performing an analysis such as NMR.

(Crosslinker)

The sheet of the present invention preferably further comprises at least any one selected from crosslinkers and functional groups derived from the crosslinkers. The crosslinker is preferably a crosslinker that crosslinks a polyvinyl alcohol-based resin. Thus, by allowing a sheet to comprise a crosslinker and/or a crosslinker-derived functional group, a sheet having a good balance between tensile strength and tensile elastic modulus can be easily obtained.

When the sheet of the present invention comprises a crosslinker-derived functional group, the crosslinker added upon production of the sheet crosslinks a polyvinyl alcohol-based resin, and a part of the crosslinked structure is detected as a crosslinker-derived functional group. Detection of a crosslinker and/or a crosslinker-derived functional group can be analyzed, for example, by NMR measurement, IR measurement, MS fragment analysis, UV analysis, etc.

Examples of the crosslinker may include: inorganic crosslinkers such as a chromium compound, an aluminum compound, a zirconium compound, or a boron compound; organic crosslinkers such as glyoxal, glyoxylic acid and a metal salt thereof, a urea resin, polyamine polyamide epichlorohydrin, polyethylenimine, a carbodiimide compound, an oxazoline compound, an aziridine compound, a hydrazine compound, an isocyanate compound, a melamine compound, an epoxy compound, an aldehyde compound, an N-methylol compound, an acryloyl compound, an active halogen compound, or an ethylenimino compound; and metals and metal complex salts. Among others, in the present invention, a hydrazine compound is preferably used. The crosslinker is preferably a crosslinker that crosslinks a polyvinyl alcohol-based resin, and such a crosslinker may crosslink ultrafine cellulose fibers, or may also crosslink ultrafine cellulose fibers and a polyvinyl alcohol-based resin.

Examples of the hydrazine compound may include benzoic acid hydrazide, formic acid hydrazide, acetic acid hydrazide, propionic acid hydrazide, n-butyric acid hydrazide, isobutyric acid hydrazide, n-valeric acid hydrazide, isovaleric acid hydrazide, pivalic acid hydrazide, carbohydrazide, adipic acid dihydrazide, phthalic acid dihydrazide, isophthalic acid dihydrazide, terephthalic acid dihydrazide, oxalic acid dihydrazide, malonic acid dihydrazide, succinic acid dihydrazide, glutaric acid dihydrazide, sebacic acid dihydrazide, maleic acid dihydrazide, fumaric acid dihydrazide, itaconic acid dihydrazide, and polyacrylic acid hydrazide. These hydrazine compounds may be used alone as a single type, or in combination of two or more types. Among others, dicarboxylic acid dihydrazide, such as adipic acid dihydrazide, phthalic acid dihydrazide, isophthalic acid dihydrazide, terephthalic acid dihydrazide, oxalic acid dihydrazide, malonic acid dihydrazide, succinic acid dihydrazide, glutaric acid dihydrazide, sebacic acid dihydrazide, maleic acid dihydrazide, fumaric acid dihydrazide or itaconic acid dihydrazide, is preferable; and taking into consideration solubility in water or safety, adipic acid dihydrazide is more preferable.

For example, when crosslinked polyvinyl alcohol is obtained by crosslinking acetoacetyl group modified polyvinyl alcohol, and when adipic acid dihydrazide is used as a crosslinker, the amino groups at both ends of the adipic acid dihydrazide are each subjected to an enamine reaction with carbonyl groups in the acetoacetyl groups, so as to form a crosslinked structure. In the present invention, a crosslinker and modified polyvinyl alcohol are selected depending on purpose, so that various crosslinked polyvinyl alcohols can be formed.

The content of the crosslinker is preferably 0.05% by mass or more and 30% by mass or less, with respect to the total mass of the polyvinyl alcohol-based resin. By setting the content of the crosslinker within the above-described range, the content of the crosslinked polyvinyl alcohol can be easily set within an appropriate range.

Moreover, when the sheet comprises a crosslinker and/or a crosslinker-derived functional group, the content of the polyvinyl alcohol-based resin is preferably 5% by mass or more, and more preferably 9% by mass or more, with respect to the total mass of the sheet. On the other hand, when the sheet comprises a crosslinker and/or a crosslinker-derived functional group, the content of the polyvinyl alcohol-based resin is preferably 94% by mass or less, and more preferably 90% by mass or less, with respect to the total mass of the sheet. The total content of the polyvinyl alcohol-based resin, the crosslinker and the crosslinker-derived functional group can be calculated by NMR measurement, MS fragment analysis, IR measurement, UV analysis, etc.

(Optional Component)

The sheet of the present invention may comprise optional components other than the aforementioned components. Examples of such optional components may include antifoaming agents, lubricants, ultraviolet absorbing agents, dyes, pigments, stabilizers, and surfactants. Other examples of the optional components may include hydrophilic polymers (except for the above-described polyvinyl alcohol-based resins and cellulose fibers) and organic ions.

Moreover, a thermoplastic resin emulsion, a thermosetting resin emulsion, a photocurable resin emulsion, etc. as well as the polyvinyl alcohol-based resin, may be added to the sheet of the present invention. Specific examples of such a thermoplastic resin emulsion, a thermosetting resin emulsion and a photocurable resin emulsion include those described in JP Patent Publication (Kokai) No. 2009-299043 A.

(Method for Producing Sheet)

The step of producing a sheet comprises a step of obtaining a slurry comprising cellulose fibers having a fiber width of 1000 nm or less and having a phosphoric acid group or a phosphoric acid group-derived substituent and a polyvinyl alcohol-based resin, and a step of applying this slurry onto a base material, or a step of papermaking from the slurry. In particular, the step of producing a sheet preferably comprises a step of applying a slurry comprising phosphorylated ultrafine cellulose fibers and a polyvinyl alcohol-based resin (hereinafter simply referred to as a "slurry" at times) onto a base material.

In the step of obtaining a slurry, the polyvinyl alcohol-based resin is added in an amount of, preferably 5 parts by mass or more, more preferably 10 parts by mass or more, further preferably 15 parts by mass or more, and particularly preferably 20 parts by mass or more, with respect to 100 parts by mass of the ultrafine cellulose fibers comprised in the slurry. On the other hand, the additive amount of the polyvinyl alcohol-based resin is preferably 1000 parts by mass or less, and more preferably 1000 parts by mass or less, with respect to 100 parts by mass of the ultrafine cellulose fibers comprised in the slurry. By setting the additive amount of the polyvinyl alcohol-based resin within the above-described range, the dimension stability of the sheet when it is tensed can be effectively increased. Further, a sheet in which the appearance deterioration due to shrinkage and the like and the yellowness change are suppressed can be obtained.

In the step of obtaining a slurry, the polyvinyl alcohol-based resin is preferably added in a state in which it is dissolved in water. In this case, it is preferable to mix an aqueous solution comprising the polyvinyl alcohol-based resin in a concentration of 5% by mass or more and 50% by mass or less, with an ultrafine cellulose fiber-containing slurry.

<Coating Step>

The coating step is a step of applying a slurry comprising phosphorylated ultrafine cellulose fibers and a polyvinyl alcohol-based resin onto a base material, drying the slurry to form a sheet, and detaching the sheet from the base material to obtain a sheet. Use of a coating apparatus and a long base material can continuously produce sheets.

The quality of the base material used in the coating step is not particularly limited. Although a base material having higher wettability to the slurry is preferable because shrinkage of the sheet or the like upon drying is suppressed, it is preferable to select one from which a sheet formed after drying can be easily detached. Of these, a resin plate or a metal plate is preferable, without particular limitation. Examples of the base material that can be used herein include resin plates such as acrylic plates, polyethylene terephthalate plates, vinyl chloride plates, polystyrene plates, and polyvinylidene chloride plates; metal plates such as aluminum plates, zinc plates, copper plates, and iron plates; plates obtained by the oxidation treatment of surface thereof; and stainless plates and brass plates.

When the slurry has a low viscosity and spreads on the base material in the coating step, a damming frame may be fixed and used on the base material in order to obtain a sheet having a predetermined thickness and basis weight. The quality of the damming frame is not particularly limited, but it is preferable to select ones from which edges of the sheet adhere after drying can be easily detached. Of these, frames formed from resin plates or metal plates are preferable, without particular limitation. Example thereof that can be used herein include frames formed from resin plates such as acrylic plates, polyethylene terephthalate plates, vinyl chloride plates, polystyrene plates, and polyvinylidene chloride plates; from metal plates such as aluminum plates, zinc plates, copper plates, and iron plates; from plates obtained by the oxidation treatment of surface thereof; and from stainless plates and brass plates.

Examples of a coater for applying the slurry that can be used herein include roll coaters, gravure coaters, die coaters, curtain coaters, and air doctor coaters. Die coaters, curtain coaters, and spray coaters are preferable because more even thickness can be provided.

The coating temperature is not particularly limited, but it is preferably 20° C. or higher and 45° C. or lower, more preferably 25° C. or higher and 40° C. or lower, and further preferably 27° C. or higher and 35° C. or lower. When the coating temperature is equal to or higher than the above-described lower limit value, it is possible to easily apply the slurry. When the coating temperature is equal to or lower than the above-described upper limit value, it is possible to suppress volatilization of the dispersion medium upon coating.

In the coating step, it is preferable to apply the slurry so as to achieve a finished basis weight of the sheet that is 10 g/m² or more and 100 g/m² or less, and preferably, 20 g/m² or more and 60 g/m² or less. By applying the slurry so as to achieve a basis weight that is within the above-described range, a sheet having excellent strength can be obtained.

The coating step preferably includes a step of drying the slurry applied onto the base material. The drying method is not particularly limited, but any of a contactless drying method and a method of drying the sheet while locking the sheet may be used, or these methods may also be used in combination.

The contactless drying method is not particularly limited, but a method for drying by heating with hot air, infrared radiation, far-infrared radiation, or near-infrared radiation (a drying method by heating) or a method for drying in vacuum (a vacuum drying method) can be utilized. Although the drying method by heating and the vacuum drying method may be combined, the drying method by heating is usually utilized. The drying with infrared radiation, far-infrared radiation, or near-infrared radiation can be performed using an infrared apparatus, a far-infrared apparatus, or a near-infrared apparatus without particular limitations. The heating temperature for the drying method by heating is not particularly limited, but it is preferably 20° C. or higher and 150° C. or lower, and more preferably 25° C. or higher and 105° C. or lower. At the heating temperature equal to or higher than the above-described lower limit value, the dispersion medium can be rapidly volatilized. At the heating temperature equal to or lower than the above-described upper limit value, cost required for the heating can be reduced, and the thermal discoloration of the ultrafine cellulose fibers can be suppressed.

<Papermaking Step>

The step of producing a sheet may include a step of papermaking from a slurry comprising phosphorylated ultrafine cellulose fibers and a polyvinyl alcohol-based resin. Examples of a paper machine used in the papermaking step include continuous paper machines such as a Fourdrinier paper machine, a cylinder paper machine, and an inclined paper machine, and a multilayer combination paper machine, which is a combination thereof. Known papermaking such as papermaking by hand may be carried out in the papermaking step.

In the papermaking step, the slurry is wire-filtered and dehydrated to obtain a sheet that is in a wet state. The sheet is then pressed and dried to obtain a sheet. Upon filtration and dehydration of the slurry, a filter fabric for filtration is not particularly limited. It is important that ultrafine cellulose fibers or polyvinyl alcohol-based resins do not pass through the filter fabric and the filtration speed is not excessively slow. Such filter fabric is not particularly limited, and a sheet consisting of an organic polymer, a woven fabric, or a porous membrane is preferable. Preferred examples of the organic polymer include, but are not particularly limited to, non-cellulose organic polymers such as polyethylene terephthalate, polyethylene, polypropylene, and polytetrafluoroethylene (PTFE). Specific examples thereof include, but are not particularly limited to, a polytetrafluoroethylene porous membrane having a pore size of 0.1 μm or more and 20 μm or less, for example, 1 μm, and woven fabric made of polyethylene terephthalate or polyethylene having a pore size of 0.1 μm or more and 20 μm or less, for example, 1 μm.

A method for producing a sheet from a slurry is not particularly limited, but an example thereof is the method disclosed in WO 2011/013567 comprising using a production apparatus. This production apparatus comprises a dewatering section for ejecting an ultrafine cellulose fiber-containing slurry onto the upper surface of an endless belt and then dewatering a dispersion medium contained in the ejected slurry to form a web, and a drying section for drying the web to produce a fiber sheet. The endless belt is provided across from the dewatering section to the drying section, and the web formed in the dewatering section is transferred to the drying section while being placed on the endless belt.

The dehydration method that can be adopted in the present invention is not particularly limited. An example of the method is a dehydration method conventionally used for paper production. A preferred example is a method comprising performing dehydration using a Fourdrinier, cylinder, tilted wire, or the like and then performing dehydration using a roll press. In addition, a drying method is not particularly limited, but an example thereof is a method used for paper production and for example a method using a cylinder dryer, a yankee dryer, hot air drying, a near-infrared heater, or an infrared heater is preferable.

(Laminate)

The present invention may relate to a laminate having a structure in which an additional layer is laminated on the sheet. Such an additional layer may be provided on both surfaces of the sheet, or may also be provided on one surface of the sheet. Examples of the additional layer that is laminated on at least one surface of the sheet may include, for example, a resin layer and an inorganic layer.

Specific examples of the laminate may include, for example, a laminate in which a resin layer is directly laminated on at least one surface of a sheet, a laminate in which an inorganic layer is directly laminated on at least one surface of a sheet, a laminate in which a resin layer, a sheet and an inorganic layer are laminated in this order, a laminate in which a sheet, a resin layer and an inorganic layer are laminated in this order, and a laminate in which a sheet, an inorganic layer and a resin layer are laminated in this order. The layer configuration of the laminate is not limited to the above-described examples, and the laminate can have various aspects depending on intended use.

<Resin Layer>

The resin layer is a layer that has a natural resin or a synthetic resin as a main component. In this context, the main component refers to a component comprised in 50% by mass or more, based on the total mass of the resin layer. The content of the resin is preferably 60% by mass or more, more preferably 70% by mass or more, further preferably 80% by mass or more, and particularly preferably 90% by mass or more, based on the total mass of the resin layer. It is to be noted that the content of the resin may be set at 100% by mass, or may also be set at 95% by mass or less, based on the total mass of the resin layer.

Examples of natural resins may include rosin-based resins, such as rosin, rosin ester and hydrated rosin ester.

The synthetic resin is preferably at least one selected from, for example, polycarbonate resins, polyethylene terephthalate resins, polyethylene naphthalate resins, polyethylene resins, polypropylene resins, polyimide resins, polystyrene resins and acrylic resins. Among them, the synthetic resin is preferably at least one selected from polycarbonate resins and acrylic resins, and more preferably a polycarbonate resin. It is to be noted that the acrylic resin is preferably at least any one selected from polyacrylonitrile and poly (meth)acrylate.

Examples of the polycarbonate resin, which constitutes the resin layer, include aromatic polycarbonate-based resins and aliphatic polycarbonate-based resins. These specific polycarbonate-based resins are known, and a polycarbonate-based resin described in JP Patent Publication (Kokai) No. 2010-023275 A is included, for example.

One resin that constitutes the resin layer may be used alone, or a copolymer obtained by copolymerization or graft polymerization of a plurality of resin components may be used. Alternatively, a plurality of resin components may be mixed by a physical process and used as a blend material.

An adhesive layer may be provided between the sheet and the resin layer, or the sheet and the resin layer may directly adhere to each other without providing an adhesive layer. When an adhesive layer is provided between the sheet and the resin layer, examples of adhesives, which constitute the adhesive layer may include, for example, acrylic resins. Examples of adhesives other than acrylic resins include, for example, vinyl chloride resins, (meth)acrylic acid ester resins, styrene/acrylic acid ester copolymer resins, vinyl acetate resins, vinyl acetate/(meth)acrylic acid ester copolymer resins, urethane resins, silicone resins, epoxy resins, ethylene/vinyl acetate copolymer resins, polyester-based resins, polyvinyl alcohol resins, ethylene vinyl alcohol copolymer resins, rubber-based emulsions such as SBR and NBR, and the like.

When no adhesive layer is provided between the sheet and the resin layer, the resin layer may have an adhesion aid, or the surface of the resin layer may be surface-treated by a hydrophilization treatment or the like.

Examples of the adhesion aid may include, for example, compounds containing at least one selected from an isocyanate group, a carbodiimide group, an epoxy group, an oxazoline group, an amino group and a silanol group, and organic silicon compounds. Among them, the adhesion aid is preferably at least one selected from a compound containing an isocyanate group (isocyanate compound) and an organic silicon compound. Examples of the organic silicon compound may include, for example, silane coupling agent condensates and silane coupling agents.

Examples of the surface treatment method other than the hydrophilic treatment may include a corona treatment, a plasma discharge treatment, a UV irradiation treatment, an electron beam irradiation treatment, and a flame treatment.
<Inorganic Layer>

Substances constituting the inorganic layer are not particularly limited, but examples thereof include aluminum, silicon, magnesium, zinc, tin, nickel, and titanium; oxides, carbides, nitrides, oxycarbides, oxynitrides, and oxycarbonitrides thereof; and mixtures thereof. From the viewpoint that high moisture resistance can be stably maintained, silicon oxide, silicon nitride, silicon oxycarbide, silicon oxynitride, silicon oxycarbonitride, aluminum oxide, aluminum nitride, aluminum oxycarbide, aluminum oxynitride, or mixtures thereof are preferable.

A method for forming an inorganic layer is not particularly limited. In general, methods of forming a thin film are roughly classified into Chemical Vapor Deposition (CVD) and Physical Vapor Deposition (PVD), either of which may be employed. Specific examples of CVD methods include plasma CVD, which utilizes plasma, and Catalyst Chemical Vapor Deposition (Cat-CVD) including catalytically cracking material gas using a heated catalyzer. Specific examples of PVD methods include vacuum deposition, ion plating, and sputtering.

As a method for forming an inorganic layer, Atomic Layer Deposition (ALD) can also be employed. The ALD method is a method for forming a thin film in an atomic layer unit by alternately supplying each of source gases of elements constituting the film to be formed to the surface on which a layer is to be formed. This method, albeit disadvantageous in a slow deposition rate, can more smoothly cover even a surface having a complicated shape than the plasma CVD method and has the advantage that a thin film having fewer defects can be formed. The ALD method also has the advantage that this method can control a film thickness at a nano order and can relatively easily cover a wide surface, for example. The ALD method can be further expected to improve a reaction rate, to achieve a low-temperature process, and to decrease unreacted gas, by using plasma.
(Intended Use)

The sheet of the present invention is suitable for intended uses such as light transmissive substrates for various display devices, various solar cells, and the like. In addition, the sheet of the present invention is also suitable for intended uses such as substrates of electronic devices, components of consumer electronics, window materials of various types of vehicles or buildings, interior materials, exterior materials, and wrapping materials. Moreover, the sheet of the present invention is also suitable for purposes such as threads, filters, woven fabrics, buffering materials, sponges, polishing materials, and other purposes of using the resin composite itself as a reinforcing material.

EXAMPLES

The characteristics of the present invention will be more specifically described in the following examples and comparative examples. The materials, used amounts, ratios, treatment contents, treatment procedures, etc. can be appropriately modified, unless they are deviated from the gist of the present invention. Accordingly, the scope of the present invention should not be restrictively interpreted by the following specific examples.

Example 1

<Production of Phosphoric Acid Group-Introduced Cellulose Fibers>

Pulp manufactured by Oji Paper Co., Ltd. (solid content: 93% by mass, basis weight: 208 g/m$^2$, sheet-shaped, Canadian Standard Freeness (CSF) measured according to JIS P 8121 after defibration: 700 ml) was used as softwood kraft pulp. 100 Parts by mass (absolute dry mass) of the softwood kraft pulp were impregnated with a mixed aqueous solution of ammonium dihydrogen phosphate and urea, and were then compressed to result in 49 parts by mass of the ammonium dihydrogen phosphate and 130 parts by mass of the urea, so as to obtain chemical-impregnated pulp. The obtained chemical-impregnated pulp was dried in a dryer of 105° C. for moisture evaporation to pre-dry the chemical-impregnated pulp. Then, the chemical-impregnated pulp was heated in an air-blow dryer set at 140° C. for 10 minutes, so that a phosphoric acid group was introduced into cellulose in the pulp to obtain phosphorylated pulp. 10000 Parts by mass of ion exchange water were poured onto 100 parts by mass (absolute dry mass) of the obtained phosphorylated pulp, which was then uniformly dispersed by stirring, followed by filtration and dehydration to obtain a dehydrated sheet. This step was repeated twice to obtain phosphoric acid modified cellulose fibers. Subsequently, 5000 ml of ion exchange water was added to the cellulose into which the phosphoric acid group had been introduced, and the resultant mixture was stirred and washed, and then dehydration was carried out. The dehydrated pulp was diluted with 5000 ml of ion exchange water, and a 1 N aqueous solution of sodium hydroxide was gradually added, while stirring, until the pH became 12 or more and 13 or less, so as to obtain a pulp dispersion. Then, this pulp dispersion was dehydrated and washed with 5000 ml of ion exchange water. This dehydration and washing was repeated one more time. The amount of phosphoric acid groups introduced into the obtained phosphoric acid modified cellulose fibers was 0.98 mmol/g. In addition, the obtained phosphoric acid modified cellulose fibers had a fiber width of approximately 4 to 20 nm.

<Mechanical Treatment>

Ion exchange water was added to the pulp obtained after the washing and dehydration to produce a pulp suspension having a solid concentration of 1.0% by mass. This pulp suspension was treated using a wet atomization apparatus (Ultimizer, manufactured by Sugino Machine Limited) at a pressure of 245 MPa five times to obtain an ultrafine cellulose fiber suspension.

<Dissolving of Polyvinyl Alcohol>

Polyvinyl alcohol (manufactured by KURARAY CO., LTD.; POVAL 105; polymerization degree: 500; saponification degree: 98 to 99 mol %) was added to ion exchange water to result in an amount of 20% by mass, and the mixture was then stirred at 95° C. for 1 hour, so that polyvinyl alcohol was dissolved therein.

<Sheet Formation>

The polyvinyl alcohol solution was added to the ultrafine cellulose fiber suspension, so that 10 parts by mass of the polyvinyl alcohol could be used with respect to 100 parts by mass of the ultrafine cellulose fibers. Thereafter, the concentration of the prepared solution was adjusted to result in a solid concentration of 0.6% by mass. The suspension was weighed so that the finished basis weight of the sheet became 45 g/m$^2$, was then developed onto a commercially available acrylic plate, and was then dried with a dryer at 70° C. for 24 hours. Here, a plate for damming was arranged on the acrylic plate so as to have a predetermined basis weight. As a result of the above procedures, a sheet was obtained, and its thickness was 30 μm.

Example 2

A sheet was obtained in the same manner as that of Example 1, with the exception that the solution was prepared so that the additive amount of polyvinyl alcohol became 25 parts by mass.

Example 3

A sheet was obtained in the same manner as that of Example 1, with the exception that the solution was prepared so that the additive amount of polyvinyl alcohol became 67 parts by mass.

Example 4

A sheet was obtained in the same manner as that of Example 1, with the exception that the solution was prepared so that the additive amount of polyvinyl alcohol became 100 parts by mass.

Example 5

A sheet was obtained in the same manner as that of Example 1, with the exception that the solution was prepared so that the additive amount of polyvinyl alcohol became 150 parts by mass.

Example 6

A sheet was obtained in the same manner as that of Example 1, with the exception that the solution was prepared so that the additive amount of polyvinyl alcohol became 233 parts by mass.

Example 7

A sheet was obtained in the same manner as that of Example 1, with the exception that the solution was prepared so that the additive amount of polyvinyl alcohol became 400 parts by mass.

Example 8

A sheet was obtained in the same manner as that of Example 1, with the exception that the solution was prepared so that the additive amount of polyvinyl alcohol became 900 parts by mass.

Example 9

Acetoacetyl group modified polyvinyl alcohol (manufactured by The Nippon Synthetic Chemical Industry Co., Ltd.; GOHSENX Z200) was added to ion exchange water to result in an amount of 10% by mass, and the mixture was then stirred at 95° C. for 1 hour, so that the polyvinyl alcohol was dissolved therein. A sheet was obtained in the same manner as that of Example 1, with the exception that the above-prepared acetoacetyl group modified polyvinyl alcohol solution was added to ultrafine cellulose fiber suspension, so that 25 parts by mass of acetoacetyl group modified polyvinyl alcohol could be used with respect to 100 parts by mass of the ultrafine cellulose fibers.

Example 10

A sheet was obtained in the same manner as that of Example 9, with the exception that the solution was prepared so that the additive amount of acetoacetyl group modified polyvinyl alcohol became 100 parts by mass.

Example 11

A sheet was obtained in the same manner as that of Example 9, with the exceptions that the solution was prepared so that the additive amount of acetoacetyl group modified polyvinyl alcohol became 22.5 parts by mass with respect to 100 parts by mass of the ultrafine cellulose fibers and further that a crosslinker (manufactured by Nihon Kasei CO., LTD.; adipic acid dihydrazide; concentration: 35%)

was added to the solution so that the additive amount of adipic acid dihydrazide became 2.5 parts by mass.

Example 12

A sheet was obtained in the same manner as that of Example 11, with the exceptions that the solution was prepared so that the additive amount of acetoacetyl group modified polyvinyl alcohol became 135 parts by mass, and further that the crosslinker was added to the solution so that the additive amount of adipic acid dihydrazide became 15 parts by mass.

Comparative Example 1

Undried needle bleached kraft pulp corresponding to a dry mass of 100 parts by mass, 1.6 parts by mass of TEMPO, and 10 parts by mass of sodium bromide were dispersed in 10000 parts by mass of water. Subsequently, an aqueous solution containing 13% by mass of sodium hypochlorite was added thereto, such that the amount of sodium hypochlorite became 3.5 mmol with respect to 1.0 g of the pulp, to start reaction. During the reaction, the pH was kept at pH 10 or more and pH 11 or less by the dropwise addition of a 1.0 M sodium hydroxide aqueous solution. The point in time when change in pH was no longer seen was considered to be termination of the reaction, and carboxyl groups were introduced into the pulp. Thereafter, this pulp slurry was dehydrated to obtain a dehydrated sheet, and 5000 parts by mass of ion exchange water were poured onto the pulp, which was then uniformly dispersed by stirring, and then, filtration and dehydration were performed on the resultant to obtain a dehydrated sheet. This step was repeated twice, so as to obtain carboxyl group modified cellulose fibers. The amount of carboxyl groups introduced into the obtained carboxyl group modified cellulose fibers was 1.01 mmol/g. A sheet was obtained in the same manner as that of Example 4, with the exception that these cellulose fibers were used as raw materials.

Comparative Example 2

A sheet was obtained in the same manner as that of Example 4, with the exception that polyethylene glycol (WAKO PURE CHEMICAL, molecular weight: 400,000) was added in place of polyvinyl alcohol.

Comparative Example 3

A sheet was obtained in the same manner as that of Example 1, with the exception that polyvinyl alcohol was not added.

Comparative Example 4

A sheet was obtained in the same manner as that of Example 1, with the exception that the solution was prepared so that the amount of polyvinyl alcohol became 1900 parts by mass.

[Evaluation]

<Methods>

The sheets produced in Examples and Comparative Examples were evaluated according to the following evaluation methods.

(1) Measurement of Amount of Substituent on Surface of Cellulose (Titration Method)

The amount of the phosphoric acid group introduced was measured by diluting the cellulose with ion exchange water to a content of 0.2% by mass, then treating with an ion exchange resin, and titrating with alkali. In the treatment with the ion exchange resin, 1/10 by volume of a strongly acidic ion exchange resin (manufactured by Organo Corporation; Amberjet 1024; conditioned) was added to a slurry containing 0.2% by mass of the cellulose, and the resultant mixture was shaken for 1 hour. Then, the mixture was poured onto a mesh having 90-μm apertures to separate the resin from the slurry. In the alkali titration, the change in the electric conductivity value indicated by the slurry was measured while adding a 0.1 N aqueous solution of sodium hydroxide to the slurry containing cellulose fibers after the ion exchange. Specifically, the alkali amount (mmol) required in the first region of the curve shown in FIG. 1 was divided by the solid content (g) in the slurry to be titrated, and the obtained value was taken as the amount (mmol/g) of the substituent introduced.

With regard to the amount of the carboxyl group introduced, the alkali amount (mmol) required in the first region of the curve shown in FIG. 2 (carboxyl group) was divided by the solid content (g) in the slurry to be titrated, and the obtained value was taken as the amount (mmol/g) of the substituent introduced.

(2) Total Light Transmittance of Sheet

Total light transmittance was measured in accordance with JIS K 7361, using a hazemeter (manufactured by MURAKAMI COLOR RESEARCH LABORATORY Co., Ltd.; HM-150).

(3) Haze of Sheet

Haze was measured in accordance with JIS K 7136, using a hazemeter (manufactured by MURAKAMI COLOR RESEARCH LABORATORY Co., Ltd.; HM-150).

(4) Yellowness Before and after Heating

Before and after heating the sheet, yellowness was measured in accordance with JIS K 7373, using Colour Cute i (manufactured by Suga Test Instruments Co., Ltd.). It is to be noted that yellowness after heating was defined to be the yellowness of a sheet that had been subjected to vacuum drying at 200° C. for 4 hours. In addition, ΔYI, a changed amount of yellowness, was calculated according to the following equation:

$$\Delta YI = (\text{yellowness after heating}) - (\text{yellowness before heating})$$

(5) Tensile Property of Sheet

Tensile elastic modulus was measured in accordance with JIS P 8113, using a tension testing machine "Tensilon" (manufactured by A & D Company, Limited). Upon the measurement of tensile elastic modulus, a test piece prepared by humidity conditioning for 24 hours at 23° C. and a relative humidity of 50% was used.

(6) Appearance

The appearance of the sheets was evaluated in accordance with the following judgment criteria.

◯: wrinkle and shrinkage do not occur, and the sheet shape is smooth.

x: wrinkle and shrinkage clearly occur, and the sheet shape is not smooth.

TABLE 1

| | Functional group | Functional group introduced [mmol/g] | Fiber diameter [nm] | Water-soluble polymer | Polymerization degree | Cross-linker | Mixing ratio [part by mass] CNF | Mixing ratio [part by mass] PVA | Mixing ratio [part by mass] Cross-linker | Content [mass % to sheet] CNF |
|---|---|---|---|---|---|---|---|---|---|---|
| Ex. 1 | Phosphoric acid group | 0.98 | 4-20 | Unmodified PVA | 500 | No | 100 | 10 | 0 | 90.9 |
| Ex. 2 | Phosphoric acid group | 0.98 | 4-20 | Unmodified PVA | 500 | No | 100 | 25 | 0 | 80.0 |
| Ex. 3 | Phosphoric acid group | 0.98 | 4-20 | Unmodified PVA | 500 | No | 100 | 67 | 0 | 59.9 |
| Ex. 4 | Phosphoric acid group | 0.98 | 4-20 | Unmodified PVA | 500 | No | 100 | 100 | 0 | 50.0 |
| Ex. 5 | Phosphoric acid group | 0.98 | 4-20 | Unmodified PVA | 500 | No | 100 | 150 | 0 | 40.0 |
| Ex. 6 | Phosphatic acid group | 0.98 | 4-20 | Unmodified PVA | 500 | No | 100 | 233 | 0 | 30.0 |
| Ex. 7 | Phosphoric acid group | 0.98 | 4-20 | Unmodified PVA | 500 | No | 100 | 400 | 0 | 20.0 |
| Ex. 8 | Phosphoric acid group | 0.98 | 4-20 | Unmodified PVA | 500 | No | 100 | 900 | 0 | 10.0 |
| Ex. 9 | Phosphoric acid group | 0.98 | 4-20 | Acetoacetyl modified PVA | 1200 | No | 100 | 25 | 0 | 80.0 |
| Ex. 10 | Phosphoric acid group | 0.98 | 4-20 | Acetoacetyl modified PVA | 1200 | No | 100 | 100 | 0 | 50.0 |
| Ex. 11 | Phosphoric acid group | 0.98 | 4-20 | Acetoacetyl modified PVA | 1200 | Yes | 100 | 22.5 | 2.5 | 80.0 |
| Ex. 12 | Phosphoric acid group | 0.98 | 4-20 | Acetoacetyl modified PVA | 1200 | Yes | 100 | 135 | 15 | 40.0 |
| Comp. Ex. 1 | Carboxyl group | 1.01 | 4-20 | PVA | 500 | No | 100 | 100 | 0 | 50.0 |
| Comp. Ex. 2 | Phosphoric acid group | 0.98 | 4-20 | PEG | — | No | 100 | 100 | 0 | 50.0 |
| Comp. Ex. 3 | Phosphoric acid group | 0.98 | 4-20 | No | — | No | 100 | 0 | 0 | 100.0 |
| Comp. Ex. 4 | Phosphoric acid group | 0.98 | 4-20 | PVA | 500 | No | 100 | 1900 | 0 | 5.0 |

| | Content [mass % to sheet] PVA | Content [mass % to sheet] Cross-linker | Total light transmittance [%] | Haze [%] | Yellowness (YI) Before heating | Yellowness (YI) After heating | ΔYI | Tensile elastic modulus [GPa] | Appearance |
|---|---|---|---|---|---|---|---|---|---|
| Ex. 1 | 9.1 | 0.0 | 91.3 | 0.4 | 0.7 | 17.68 | 16.98 | 6.8 | ○ |
| Ex. 2 | 20.0 | 0.0 | 91.2 | 0.3 | 0.8 | 18.8 | 18.0 | 6.8 | ○ |
| Ex. 3 | 40.1 | 0.0 | 91.3 | 0.3 | 0.7 | 18.1 | 17.4 | 5.9 | ○ |
| Ex. 4 | 50.0 | 0.0 | 91.2 | 0.2 | 0.9 | 14.2 | 13.3 | 6.0 | ○ |
| Ex. 5 | 60.0 | 0.0 | 91.3 | 0.1 | 0.5 | 25.9 | 25.4 | 4.8 | ○ |
| Ex. 6 | 70.0 | 0.0 | 91.4 | 0.2 | 0.5 | 19.3 | 18.8 | 4.2 | ○ |
| Ex. 7 | 80.0 | 0.0 | 91.5 | 0.2 | 0.4 | 25.0 | 24.6 | 3.7 | ○ |
| Ex. 8 | 90.0 | 0.0 | 91.5 | 0.2 | 0.5 | 10.0 | 9.5 | 3.5 | ○ |
| Ex. 9 | 20.0 | 0.0 | 91.3 | 0.2 | 0.9 | 14.03 | 13.13 | 6.0 | ○ |
| Ex. 10 | 50.0 | 0.0 | 91.4 | 0.2 | 0.6 | 10.03 | 9.43 | 4.4 | ○ |
| Ex. 11 | 18.0 | 2.0 | 91.2 | 0.4 | 1.07 | 32.28 | 31.21 | 7.0 | ○ |
| Ex. 12 | 54.0 | 6.0 | 90.8 | 0.3 | 2.39 | 53.22 | 50.83 | 7.4 | ○ |
| Comp. Ex. 1 | 50.0 | 0.0 | 91.1 | 2.1 | 1.6 | 122.9 | 121.3 | 4.6 | ○ |
| Comp. Ex. 2 | 50.0 | 0.0 | 91.2 | 30 | 1.03 | 5.75 | 4.72 | 3.2 | ○ |
| Comp. Ex. 3 | 0.0 | 0.0 | 91.0 | 0.3 | 1.0 | 25.8 | 24.8 | 6.6 | x |
| Comp. Ex. 4 | 95.0 | 0.0 | 91.6 | 0.2 | 0.23 | 75.85 | 75.62 | 2.9 | x |

In the sheets obtained in the Examples, the yellowness after heating was suppressed, and ΔYI values were also suppressed. Also, the sheets obtained in the examples had high tensile elastic modulus and were excellent in tensile dimension stability. Further, in the sheets obtained in the examples, shrinkage was suppressed and was excellent in appearance.

In Comparative Examples 2 and 4, it was confirmed that maximum point load under tension was low compared with the sheets obtained in Examples 1-12. As mentioned above, the sheets obtained in the examples are excellent in tensile dimensional stability as compared with Comparative Examples 2 and 4.

The invention claimed is:

1. A sheet comprising:
   cellulose fibers having a fiber width of 2 to 50 nm and having a phosphoric acid group or a phosphoric acid group-derived substituent; and
   a polyvinyl alcohol-based resin,
   wherein the sheet has a tensile elastic modulus of 4.0 GPa or more,
   the average degree of polymerization of the polyvinyl alcohol-based resin is 300 to 2200,
   the saponification degree of the polyvinyl alcohol is 50 mol % or more,
   the content of the cellulose fibers is 10% by mass or more with respect to the total mass of the sheet, and
   the sheet is made from a suspension which contains the cellulose fibers and the polyvinyl alcohol-based resin.

2. The sheet according to claim 1, wherein the content of the polyvinyl alcohol-based resin is 9% by mass or more, with respect to the total mass of the sheet.

3. The sheet according to claim 1, wherein the polyvinyl alcohol-based resin is a modified polyvinyl alcohol-based resin.

4. The sheet according to claim 1, which further comprises at least any one selected from crosslinkers and crosslinker-derived functional groups.

5. The sheet according to claim 1, wherein, when the yellowness of a sheet measured in accordance with JIS K 7373 is set at $YI_1$ and the yellowness of a sheet after being subjected to vacuum drying at 200° C. for 4 hours is $YI_2$, the value of $YI_2-YI_1$ is 70 or less.

6. The sheet according to claim 4, wherein the content of the polyvinyl alcohol-based resin is 90% by mass or less, with respect to the total mass of the sheet.

* * * * *